United States Patent [19]
Amoroso, Jr.

[11] 3,935,533
[45] Jan. 27, 1976

[54] SINGLE OSCILLATOR MICROWAVE TRANSCEIVER

[75] Inventor: Salvatore Amoroso, Jr., Fairfield, Conn.

[73] Assignee: United Technologies Corporation, Hartford, Conn.

[22] Filed: Aug. 29, 1974

[21] Appl. No.: 501,721

Related U.S. Application Data

[63] Continuation of Ser. No. 337,609, March 2, 1973, abandoned.

[52] U.S. Cl. .................... 325/20; 325/22; 343/180
[51] Int. Cl.² .......................................... H04B 1/40
[58] Field of Search .............................. 325/17–20, 325/23, 24, 25, 430, 438; 343/175, 179, 180; 178/58 R, 59, 60; 179/170 R, 170 NC, 170 T

[56] References Cited
UNITED STATES PATENTS

| | | | |
|---|---|---|---|
| 2,477,039 | 7/1949 | Braak.................................. | 325/17 |
| 2,507,139 | 5/1950 | Boosman ........................... | 325/20 X |
| 2,704,362 | 3/1955 | Bergan............................... | 325/20 X |
| 2,757,279 | 7/1956 | Vosburgh........................... | 343/179 |
| 2,972,047 | 2/1961 | Werner et al...................... | 325/20 X |
| 3,387,231 | 6/1968 | Müller et al. ...................... | 325/20 X |
| 3,540,049 | 11/1970 | Gaunt, Jr. .......................... | 343/180 |

*Primary Examiner*—Benedict V. Safourek
*Attorney, Agent, or Firm*—M. P. Williams

[57] ABSTRACT

A voltage variable oscillator feeds an FM modulated signal to be transmitted to an orthomode transducer connected to a dual polarization antenna, another port of the orthomode transducer feeding received FM signals to a single ended mixer, the output of which is passed through an FM receiver. The orthomode transducer leaks a portion of the transmitted wave to the single ended mixer, for use in lieu of a local oscillator, thereby limiting the requirements to a single microwave oscillator. The output of the FM receiver is applied to a cancellation circuit where the transmitter modulation is cancelled from the FM receiver output in response to delayed transmitter input signals. The output of the cancellation circuit comprises the receiver output, and is used as the signal input of a phase sensitive demodulator, the phase reference input of which is the delayed transmitter modulation, the phase sensitive demodulator controlling the gain of a variable gain amplifier so as to provide complete closed loop automatic gain control, limiting the frequency excursion of the oscillator in such a fashion as to permit complete cancellation of the transmitter input modulation from the receiver output modulation, despite any variations in circuit scale factor. In a system employing more than one transceiver having the same receiver IF frequency, an automatic frequency control loop is provided in one of the transceivers, and nominal or stabilized frequency control is applied in the other, whereby one frequency is slave to the other separated by the IF frequency; in addition, means are provided in conjunction with the cancellation circut to accommodate the opposite polarity of the discriminator output in two different transceivers communicating with one another resulting from discrimination of opposite sidebands.

14 Claims, 3 Drawing Figures

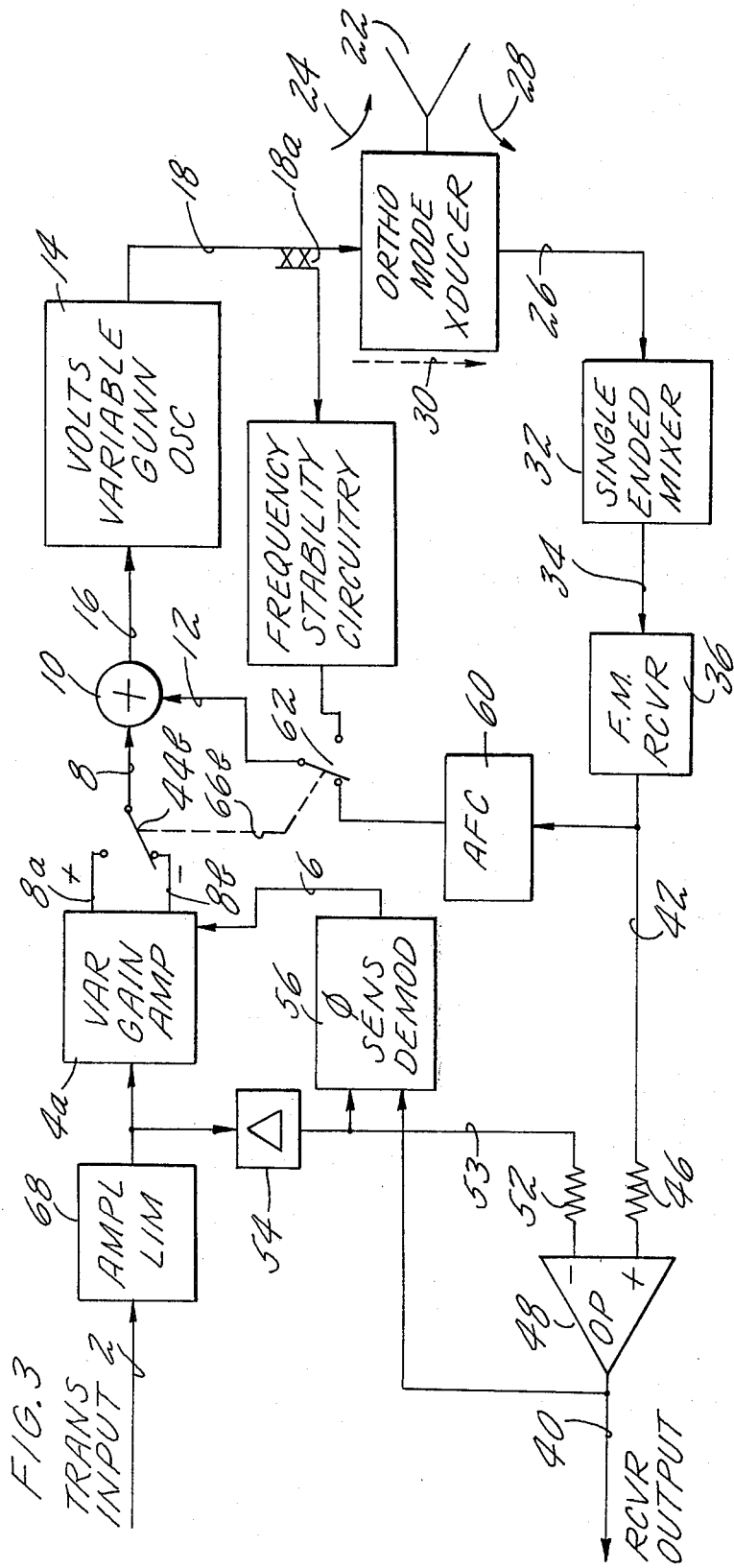
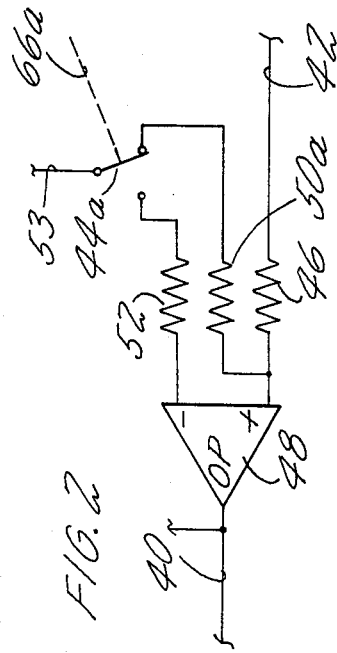

SINGLE OSCILLATOR MICROWAVE TRANSCEIVER

CROSS REFERENCE TO RELATED APPLICATIONS

This application is a continuation-in-part of my application Ser. No. 337,609, filed Mar. 2, 1973, now abandoned.

BACKGROUND OF THE INVENTION

1. Field of Invention

This invention relates to transceivers, and more particularly to single oscillator microwave transceivers.

2. Description of the Prior Art

In order to avoid the necessity of laying cable, such as in ship-to-ship communication, or in short range communication between office buildings in cities, it has long been known to use radio transmitting/receiving equipment (transceivers). In order to limit the interference between one communication link and another, and to relieve the crowding of various frequency bands, it has recently been common to employ higher and higher frequencies for transceiver communication links. However, the use of such transceivers for commercial purposes require that they be available at a reasonable cost; in addition, in certain areas such as downtown Manhattan, the frequency spectrums even at a few gigahertz (GHz) are becoming extremely crowded. A possible solution is the employment of microwave communication links having still higher frequencies. However, when the frequencies of transceivers reach tens of gigahertz, the oscillators necessary to control the frequency thereof must either comprise Klystrons or solid-state oscillators (Gunn, IMPATT, oscillator/multipliers, etc.) which are extremely expensive and may comprise a considerable portion of the cost of a transceiver.

SUMMARY OF INVENTION

An object of the present invention is to provide an improved microwave transceiver. Other objects of the present invention include provisions of an improved microwave transceiver: which does not require a balanced mixer; employing but a single microwave oscillator; and having a controlled transmission bandwidth.

In accordance with the present invention, a microwave transceiver employs a single oscillator and allows leakage of a portion of the transmitted wave to be applied together with a received wave to a single ended mixer, thereby to provide the IF frequency for the FM receiver. In further accord with the present invention, a single oscillator transceiver utilizes the FM receiver output to provide automatic frequency control to a frequency-modulated oscillator in one of a pair of communicating transceivers to lock it to the frequency of the other of the transceivers. In accordance still further with the present invention, a single oscillator microwave transceiver having cancellation of the transmitted modulation from the output of the FM receiver employs the receiver output to control the amplitude of transmitter modulation applied to the microwave oscillator, thereby to effect automatic gain control through the entire system to ensure complete cancellation of the undesired transmitter modulation signal. In still further accord with the present invention, means are provided to accommodate different FM receiver discriminator output polarities in dependence upon whether the particular transceiver transmits above or below its received frequency.

The present invention provides relatively low cost, completely reliable transceivers which are readily utilized in data and communication links with other like transceivers. The invention may be implemented at low cost not only because of the utilization of a single microwave oscillator, but because it utilizes a single ended mixer as well. The invention avoids the necessity of highly stabilized operation of oscillators in related transceivers by utilizing FM receiver output automatic frequency control over the oscillator in one of the related pair of systems, whereby that system is slaved to the other system, the frequency of which may be only nominally controlled, or may be stabilized. By utilization of a full system feedback automatic gain control circuit, complete cancellation of transmitter modulation from the receiver output renders transceivers in accordance with the present invention useful not only for speech (where a certain amount of cross modulation is tolerable) but also in digital data communication wherein signal cross talk is essentially not tolerable; it also stabilizes the transmitted frequency excursion.

Other objects, features and advantages of the present invention will become more apparent in the light of the following detailed description of preferred embodiments thereof, as illustrated in the accompanying drawing.

BRIEF DESCRIPTION OF THE DRAWING

FIG. 2 is a fragmentary schematic diagram of one modification of the embodiment of FIG. 1; and FIG. 3 is a simplified schematic block diagram of other modifications of the present invention.

DESCRIPTION OF THE PREFERRED EMBODIMENT

Figure 1:
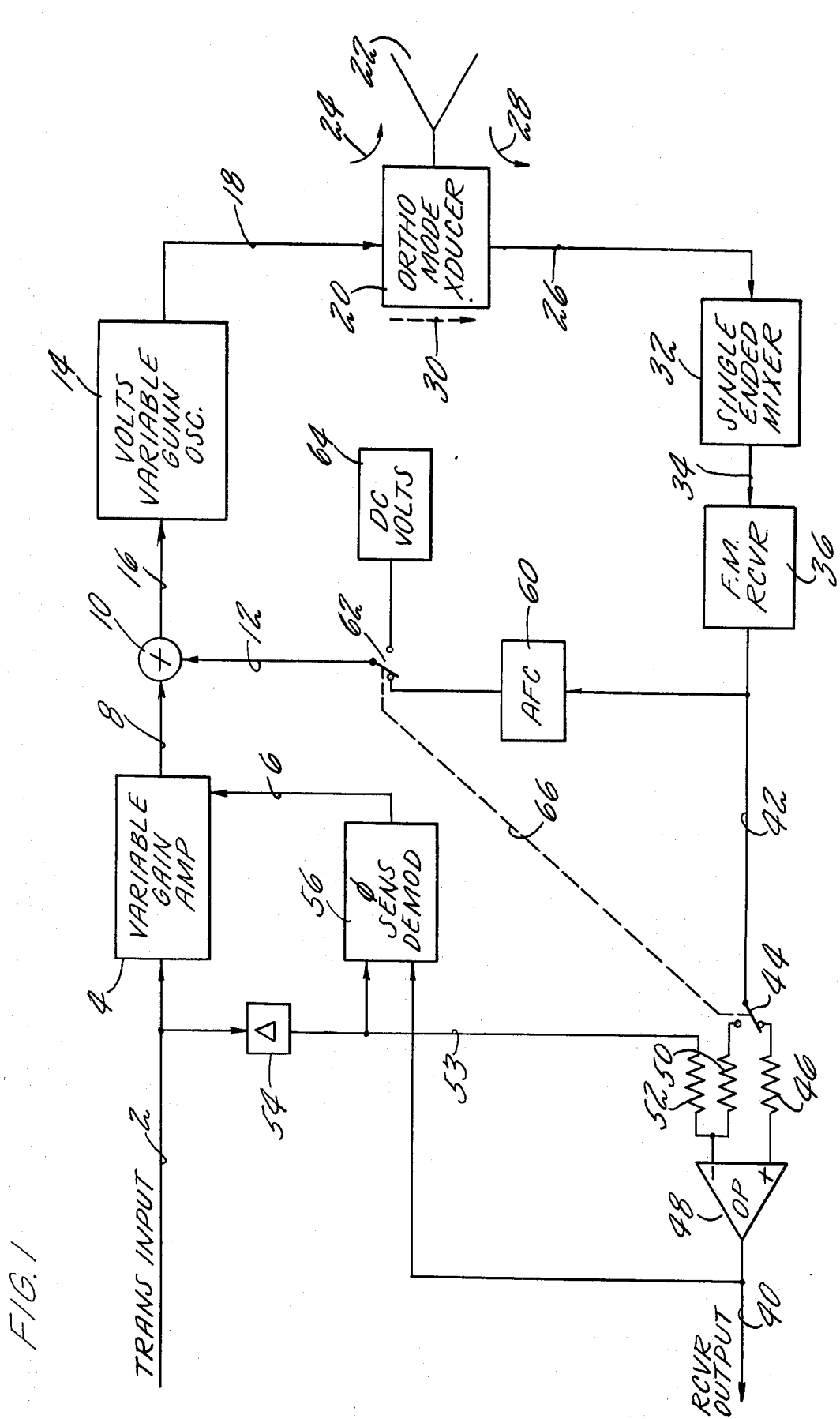
FIG. 1 is a simplified schematic block diagram of a transceiver in accordance with the present invention.

Referring now to FIG. 1, signals to be transmitted, comprising transmitter input modulation, are applied on a signal line 2 to a variable gain amplifier 4. The signals on the line 2 may comprise analog signals (such as voice or telemetry information) or digital signals, as desired. A variable gain amplifier 4 is responsive to an automatic gain control (AGC) signal on a line 6 to provide modulation signals on a line 8, the gain of the amplifier 4 being level adjusted so as to permit complete cancellation of the input modulation from receiver output signals, as described hereinafter. The line 8 is connected to a video summing unit 10 which sums the signal on the line 8 with a DC signal on a line 12 that controls the nominal or center frequency of a voltage variable oscillator 14 connected to the summing unit 10 by a line 16. Thus, a DC signal on the line 12 determines the center or carrier frequency of the oscillator 14, whereas the modulation signal on the line 8 controls the time variations and limits of frequency excursion of the FM modulation to be impressed on the carrier frequency of the oscillator 14.

The output of the oscillator 14 is applied by a suitable microwave transmission line 18 (such as coax or a waveguide) to an orthomode transducer 20 which is a polarization sensitive three port circulator having a controlled bypass or leakage characteristic. The bulk of the energy in the transmission line 18 is coupled by the orthomode transducer 20 to an antenna means 22, as indicated by an arrow 24. The antenna means may comprise one or two radiators and/or reflectors, of any known configuration for microwaves. The energy received at the antenna 22 (from a remote transmitter operating at a related frequency) is applied to a transmission line 26 as indicated by an arrow 28. In addition, however, the orthomode transducer 20 is adjustable to provide a controlled amount of leakage from the transmission line 18 to the transmission line 26 as indicated by the dashed arrow 30. The energy leaked through the orthomode transducer from the transmission line 18 to the transmission line 26 is used in lieu of a local oscillator signal for mixing with the received signal passed by the orthomode transducer 20 from the antenna 22 to the transmission line 26. Thus both the received signal and a small signal from the oscillator 14 appear on the transmission line 26, and these signals are applied to a single ended mixer 32. The output of the single ended mixer 32 is applied by a suitable transmission line 34, which may preferably comprise coaxial cable to an FM receiver 36 which typically includes a matching preamplifier designed to interface properly with the output of the single ended mixer, followed by AGC and limiting IF amplifiers, followed by a discriminator which supplies simply the desired audio or video output. In this case, however, the output of the FM receiver 36 contains not only the video which comprises the modulation on the carrier wave received at the antenna 22 from a remote transmitter, but also the modulation that is included in the signal of the oscillator 14 which is leaked through the orthomode transducer to serve as a local oscillator signal. These modulation components are of opposite polarity at the discriminator output, since they result from opposite sidebands. The transmitter modulation must be cancelled from the receiver output modulation in order to provide a receiver output signal on a line 40 which is a faithful reproduction of only the modulation of the signal received at the antenna 22 from the remote transmitter.

The output of the FM receiver 36 is applied over a line 42 to a switch 44 which can pass signals through a first resistor 46 to a positive input of an operational amplifier 48 (as in the position shown in the drawing) or can pass signals through a resistor 50 to the minus input of the operational amplifier 48. Another resistor 52 (also connected to the minus input) receives signals on a line 53 from the output of a delay unit 54 which in turn is responsive to the transmitter input modulation signal on the line 2. The delay period for the delay unit 54 is set to equal circuit propagation time from the line 2 through the variable gain amplifier 4, the oscillator 14, the transducer 20, the mixer 32 and the receiver 36. Because of opposite input polarity, the transmitter modulation is cancelled in the amplifier 48. The delay unit 54 may be a tapped delay unit if desired, so as to permit precise adjustment thereof; however, in practice, the delay can be readily determined for one unit and fixed delay units of an appropriate characteristic may thereafter be utilized. The output of the delay unit 54 on the line 53 is applied to the reference input of a phase sensitive demodulator and the output of the operational amplifier 48 on the line 40 is applied to the signal input of the phase sensitive demodulator 56, the output of which comprises the AGC signal on the line 6. The phase sensitive demodulator may be a synchronous demodulator of any well known type, which merely rectifies the signal input in full wave fashion at the frequency of the frequency control or reference input, having its output integrated (low pass filtered), as is well known. Any of the transmitter modulation which is not completely cancelled in the operational amplifier 48 and therefore appears on the line 40 will be exactly in phase with the delayed transmitter modulation output of the delay unit 54. Thus the filtered output of the phase sensitive demodulator 56 comprises a time-varying DC signal, the magnitude of which is a function of the magnitude of the transmitter input modulation which has not been cancelled and therefore still appears on the line 40. By suitable circuit parameter adjustment, this output signal on the line 6 is used to control the gain of the variable gain amplifier 4 in such a fashion that it will null the transmitter input modulation from the signal line 40 and cause complete cancellation thereof. Thus the AGC circuit (including the operational amplifier 48, the phase sensitive demodulator 56 and the variable gain amplifier 4) accommodates all the scale factors of the entire system, thereby automatically ensuring cancellation of the transmitter input modulation from the output of the FM receiver 36.

Because the sensitivity of the discriminator of the FM receiver 36 remains essentially constant after burn-in, the closed loop AGC control of the amplifier 4 absolutely ensures that the excursion of the AM modulation applied to the oscillator 14 will track the amplitude of the input modulation on the line 2, and this in turn will control the frequency excursion of the FM about the carrier frequency of the oscillator output. Therefore, control over the amplitude of the input on the line 2 will, through this closed loop AGC, control the bandwidth of the transmitted energy (to ensure it stays within the assigned bandwidth). The input amplitude can, in turn, be controlled in various ways. For instance, a standard AGC amplifier may be used; for digital information, a limiter 68 (FIG. 3) (or level setting circuit, such as a Schmidt trigger) may be used.

If it is desired to ensure AGC control over frequency excursion during non-data periods, substitute modulation may be provided to the input line 2 by various means. For instance, standard telephone T-1 type data transmissions typically provide all ONES during quiescence; if fed through a scrambler, it would provide sufficient modulation.

Thus, the cancellation of transmitter modulation is not merely the accommodation of a necessary evil attendant the single-oscillator design, it also provides transmitted bandwidth control.

In order to ensure that two transceivers of the type illustrated in the drawing are operating at frequencies separated only by the design IF frequency of the FM receiver 36, so that the difference between the local signal leaked from the transmission line 18 to the transmission line 26 and the received signal passed from the antenna to the transmission line 26 will be equal to the IF frequency, an automatic frequency control (AFC) circuit 60 (FIG.1) is connected between the output of the FM receiver 36 and the video summing amplifier 10. The output of the AFC circuit 60 is applied through a switch 62 to the signal line 12; with the switch in the position shown, the AFC circuit 60 is in the loop, and controls the carrier frequency of the oscillator 14. However, a second transceiver of the same design as that shown herein, when operating with the one shown herein, will have its switch 62 transferred to the position opposite to that shown in FIG. 1, thereby providing a DC voltage from a source 64 to a signal line 12 to control the carrier frequency of the related oscillator 14. Thus, one oscillator is only nominally controlled as to frequency by the DC source, and the oscillator of a transceiver which is receiving therefrom is locked to it, at a frequency differing therefrom by the design IF frequency, by means of the AFC circuit 60. If desired, the switch 44 and the switch 62 can be ganged together as illustrated by the dashed line 66.

The switch 44 accommodates the differing polarity of the output of the discriminator within the FM receiver 36 in dependence upon whether the received information is discriminated from a carrier frequency lower or higher than that of the oscillator 14 (upper or lower sideband, respectively). In operation, one transceiver transmits at a higher frequency than the other transceiver, the difference in carrier frequencies being equal to the IF frequencies of both of the FM receivers. In dependence upon whether the discriminated modulation is on the higher or lower of the two sidebands, the discriminator will have an output of opposite polarity. Thus in order to achieve cancellation, the FM receiver output 36 is added to the output of the delay unit 54 in one case, and is subtracted therefrom in the other case. Alternatively, the switch 44 may reverse the point of application of the line 53 instead of the line 42, if desired. Of course, two different transceivers (one with just the DC source 64, the other with just the AFC 60) could be fabricated for use in pairs. The manner of summation could also be hard wired into the two different transceivers to accommodate fixed discriminator output polarity; thereby, both switches 44, 62 could be eliminated.

As illustrated in FIG. 2, instead of applying the output of the receiver 36 on line 42 to different inputs in order to ensure cancellation of transmitter modulation or of the transceivers operating in the upper or lower sideband, the same effect can be achieved by selective application of the delayed input modulation on the line 53 to opposite ones of the operational amplifier inputs. In such a case, a switch 42b, which may be ganged to the switch 62 as indicated by the dashed line 66b will selectively apply the delayed modulation signals on a line 53 to either the resistor 52 or to a resistor 50a connected to the plus input of the operational amplifier 48, in dependence upon whether the same or different polarities, respectively, can be expected on the lines 53, 42.

A still further modification of voltage polarity relationship means for accommodating the different discriminator polarity in transceivers operating on the upper and lower sidebands is illustrated in FIG. 3. Therein, a switch 44b, which may be ganged to the switch 62 as indicated by the dashed line 66b may be connected to either of two opposite-polarity outputs 8a, 8b of the bipolar variable gain amplifier 4a so as to provide signals on the line 8 which have either the same or opposite phase relationship to the transmitter input modulation on a line 2, so that, depending on whether the upper or lower sideband is discriminated, the signals applied by the line 42 to the resistor 46 will be of the same phase as the signals applied to the resistor 52 by the line 53. An obvious further alternative is that the switch 44b may be so adjusted as to provide signals of opposite polarity in which case the lines 42 and 53 may be applied to the same input by resistors 50, 52 (as in FIG. 1 with the switch 44 in the position opposite to the position shown therein). The particular nature (±; alike or different) of the voltage polarity relationship between the transmitter input modulation and the output of the FM receiver is dependent upon various factors in the circuitry, which in any case can simply be adjusted by suitable adjustment of a switch 44, 44a, 44b or a similar switch. Further, the discriminator polarity could be reversed, if desired.

It is desired to have the polarity of the receiver ouput known to be the same for given transmitter (particularly when digital data is involved). The configuration of FIG. 3 permits this in both the master and the slave, without further accommodation. But the configurations of FIGS. 1 and 2 require a polarity reversal of the receiver output on line 40 in one case or the other (master or slave) if both are to be of the same polarity. In fact, modulation phase reversal must be effected upstream of the discriminator if common output polarity is to be achieved without an additional switch. However, it is difficult to reverse phase of FM modulation on a carrier, but it is easy to reverse polarity of AM modulation before it is converted to FM by the voltage-tunable oscillator 14. Thus, reversal at the output of the amplifier 4 is most advantageous.

One aspect of the invention is that two related transceivers transmit on frequencies separated by the common IF frequency, so that each can strip modulation off the opposite sideband of the other. In the embodiment of FIG. 1, the master transceiver has its frequency controlled nominally by a carrier voltage means comprising the DC voltage source 64, and the slave follows it by means of the AFC circuit 60. FIG. 3 illustrates that the oscillator 14 of the master transceiver may be precisely controlled by frequency stability circuitry 64a of any known type, such as that described in Section 19.2.2 of Harvey, R. F. MICROWAVE ENGINEERING; Academic Press; New York and London, 1963. This may be fed by a small portion of the oscillator output taken from the waveguide 18 by a microwave coupler 18a and transferred in a waveguide 18b. The use of the DC source 64 (FIG. 1) is permissable in some instances and greatly reduces costs; but, depending on the oscillator voltage/frequency stability, stabilization may frequently be required to maintain the modulated carrier within an assigned band.

The oscillator 14 may comprise a Klystron if desired; however, since these are tubes, they have limited life and are relatively unreliable, and in addition require a high voltage supply. Also, Klystrons and the associated equipment are very costly. On the other hand, a Gunn oscillator, capable of operating at the desired frequency (which may be on the order of 40 GHz) is preferred. In addition, since there is relatively low noise generation in a Gunn oscillator, its utilization is preferred in the present invention since a single ended mixer 32 is utilized, which does not have the noise cancellation (cancellation of AM) which is known to exist in double ended mixers. The use of the single ended mixer is an additional cost saving in accordance with the present invention. Any Gunn oscillator available on the market may be utilized, including those having varactor diodes for the tuning thereof. On the other hand, it has been found that a suitable frequency control can be provided in an oscillator not employing a varactor tuning diode, but simply a Gunn diode disposed within an appropriate cavity with suitable output coupling. Other known solid state oscillators may also be used, as desired.

The orthomode transducer may comprise any polarization sensitive circulator-type of device which operates in a fashion described hereinbefore. If the transmission line 18 is a waveguide that supports, say, only vertical polarized waves, the transducer 20 will couple most of this to the antenna, and only a small portion to the transmission line 26; thus transmission is vertical; received horizontal polarized waves are passed only to the transmission line 26. The purpose of usage of a polarization sensitive device is so that full duplex operation (sending and receiving at the same time) can be achieved without any more than the desired leakage of the transmitter output reaching the receiver. In such a case, the orthomode transducer comprises a last element feeding a radiator of a suitable type, which in turn may direct energy to a focusing dish-type reflector, or may simply feed a horn, if desired. One orthomode transducer which is found suitable for utilization in a 40 GHz range is that sold under the designation SD5652 by Microwave Development Laboratories of Natick, Massachusetts. The orthomode transducer may be replaced by a known circulator, such as that sold under the designation Model 418-8 by Electromagnetic Sciences, Inc., Atlanta, Georgia. The antenna 22 must support waves of both polarizations; by disposing the transducer at 45° to the base of the transceiver, all transceivers are neuter, polarizationwise.

The mixer 32 is a non linear microwave diode coupled into the waveguide 26 by a known microwave diode mount, such as the type described in Harvey (hereinbefore). It may comprise any well known microwave single ended mixer, such as that sold under the designation 28 DH 36-1 by Microwave Development Laboratories of Natick, Massachusetts. The mixer 32 provides at its output, the IF frequency for the receiver, which is the difference of the frequencies in the waveguide 26, as is known. The FM receiver may be any suitable receiver capable of operating with a relatively high IF frequency in view of the desired high frequency operation of the transceiver in accordance herewith. Such FM receivers in fact are available in integrated form, one suitable FM receiver being sold under the trade designation LM 361 by European Electronic Products, Culver City, California.

The AFC circuit 60 may comprise the same type of AFC circuit utilized in broadcast FM receiver circuits, and is typically a low pass filter or integrator, or may be an integrating amplifier, as is known in the art. The phase sensitive demodulator may be readily constructed of commercially available linear integrated circuits in any well known fashion. The variable gain amplifier may be of any well known type, one suitable amplifier being sold by RCA under the designation 3028.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A single oscillator microwave transceiver comprising:
    a single microwave oscillator having a frequency-controlling voltage input;
    an FM receiver;
    antenna means for transmitting and receiving microwave energy;
    means for coupling energy from said oscillator to said antenna means for transmission thereby, and for simultaneously coupling energy received at said antenna means and a small portion of the energy of said oscillator in mixed fashion to the input of said FM receiver;
    an AFC circuit connected to the output of said FM receiver;
    means for providing a substantially DC voltage suitable for controlling the carrier frequency of said microwave oscillator;
    summing means, the output of said summing means being connected to said frequency-controlling voltage input of said microwave oscillator;
    input means for applying transmitter input modulation to one input of said summing means; and
    first selectively operable means for connecting said AFC circuit or carrier voltage means to a second input of said summing means, alternatively, whereby said microwave oscillator provides a carrier frequency selectively determined by said AFC circuit or by said carrier voltage means, which is frequency modulated in accordance with said transmitter input modulation;
    wherein said input means includes a variable gain amplifier having a signal input and a gain control input, said signal input being connected to transmitter input modulation, the output of said variable gain amplifier being connected to the first input of said summing means;
    delay means responsive to transmitter input modulation for providindg delayed transmitter input modulation which is delayed by a period of time substantially equal to the circuit signal propagation time from the input of said variable gain amplifier through said FM receiver;
    second selectively operable means responsive to the output of said FM receiver and to the output of said delay means for selectively combining said delayed transmitter input modulation with the output of said FM receiver in a voltage polarity relationship to provide a receiver output signal having transmitter input modulation substantially cancelled therefrom; and
    means responsive to said receiver output signal and to said delayed transmitter input modulation for providing a gain control signal to the gain control input of said variable gain amplifier, said gain control signal adjusting the gain of said variable gain amplifier so that the magnitude of transmitter input modulation included in the output of said FM receiver is adjusted with respect to the magnitude of delayed transmitter input modulation provided by said delay unit so that the transmitter input modulation in said receiver output signal is substantially nulled to zero.

2. A transceiver according to claim 1 wherein both of said selectively operable means comprise manually operable switches.

3. A transceiver according to claim 2 wherein said manually operable switches are ganged together for concurrent operation.

4. A communication system comprising a pair of transceivers according to claim 3, said ganged switches in a first one of said transmitters being adjusted to connect said AFC circuit to said summing means and to provide a first voltage polarity relationship, said ganged switches in a second one of said transceivers being adjusted to connect said carrier voltage means to said summing means and to provide a second voltage polarity relationship opposite to said first voltage polarity relationship.

5. A single oscillator microwave transceiver comprising, in combination with a single microwave oscillator:
an FM receiver;
antenna means for transmitting and receiving microwave energy;
means for coupling energy from said oscillator to said antenna means for transmission thereby, and for simultaneously coupling energy received at said antenna means and a small portion of the energy of said oscillator in mixed fashion to the input of said FM receiver;
means including a variable gain amplifier responsive to transmitter input modulation for controlling the frequency of oscillation of said microwave oscillator;
cancellation means responsive to the output of said FM receiver and to transmitter input modulation for cancelling similar modulation from the output of said FM receiver and for thereby providing a receiver output signal; and
gain control means responsive to said cancellation means for controlling the gain of said variable gain amplifier, in a manner to null the transmitter input modulation in the receiver output signal to zero.

6. A transceiver according to claim 5 wherein said cancellation means includes means for delaying said transmitter modulation to be in phase with that coupled by said coupling means through said FM receiver, and means for alternatively adding or subtracting said delayed transmitter input modulation and said FM receiver output in dependence upon the polarity of said FM receiver output.

7. A transceiver according to claim 6 wherein said variable gain amplifier has a gain controlling input, and said gain control means comprises a phase sensitive demodulator having its phase reference input connected to the output of said delaying means, its signal input connected for response to the receiver output signal of said cancellation means, and its output connected to said gain controlling input of said variable gain amplifier.

8. A single oscillator microwave transceiver comprising:
a single microwave oscillator having a frequency-controlling voltage input;
an FM receiver;
antenna means for transmitting and receiving microwave energy;
means for coupling energy from said oscillator to said antenna means for transmission thereby, and for simultaneously coupling energy received at said antenna means and a small portion of the energy of said oscillator in mixed fashion to the input of said FM receiver;
a variable gain amplifier having a signal input and a gain control input, said signal input being connected to transmitter input modulation, the output of said variable gain amplifier being connected to said frequency-controlling voltage input of said oscillator;
delay means responsive to transmitter input modulation for providing delayed transmitter input modulation which is delayed by a period of time substantially equal to the signal propagation time from the input of said variable gain amplifier through said FM receiver;
cancel means responsive to the output of said FM receiver and to the output of said delay means for selectively combining said delayed transmitter input modulation with the output of said FM receiver in voltage combining relationship to provide a receiver output signal having transmitter input modulation substantially cancelled therefrom; and
means responsive to said receiver output signal and to said delayed transmitter input modulation for providing a gain control signal to the gain control input of said variable gain amplifier, said gain control signal adjusting the gain of said variable gain amplifier so that the magnitude of transmitter input modulation included in the output of said FM receiver is adjusted with respect to the magnitude of delayed transmitter input video provided by said delay unit so that the transmitter input modulation in said receiver output signal is substantially nulled to zero.

9. A communication system comprising a pair of transceivers according to claim 8, said cancel means in a first one of said transceivers being adjusted to provide a voltage combining relationship opposite to that of a second one of said transceivers.

10. A duplex transceiver system including a pair of transceivers settable for operation with one in a master mode and one in a slave mode, each of said transceivers comprising:
a single, voltage-tunable, solid state microwave oscillator having means for providing a frequency-controlling voltage input thereto;
an FM receiver having the same IF frequency in both of said transceivers and providing a conventional AFC signal;
antenna means for transmitting and receiving microwave energy;
means for coupling energy from said oscillator to said antenna means for transmission thereby, and for simultaneously coupling energy received at said antenna means and a small portion of the energy of said oscillator in mixed fashion to the input of said FM receiver;
means providing a carrier frequency designating signal;
means in each of said transceivers selectively operable in response to said frequency designating signal or in response to said AFC signal, alternatively, for providing a carrier frequency controlling voltage to the frequency-controlling voltage input means of said oscillator so as to control the carrier frequency of the related transceiver, whereby said transceivers, when operating in a duplex pair with one in response to said carrier frequency designating signal and one in response to said AFC signal, will each provide its own carrier frequency offset from the carrier frequency of the other by said common IF frequency, whereby the FM receivers and said transceivers provide FM receiver outputs discriminated from mutually opposite sidebands;
input means providing transmitter input modulation to said frequency controlling voltage input means of said oscillator;
delay means responsive to the transmitter input modulation of said input means for providing delayed transmitter input modulation which is delayed by a period of time substantially equal to the circuit signal propagation time from said input means through said FM receiver; and cancel means responsive to the output of said FM receiver and to the output of said delay means for combining said delayed transmitter input modulation with the output of said FM receiver, including means for controlling the polarity of the transmitter input modulation of each transceiver passed through the related FM receiver of that transceiver so as to provide it in a polarity opposite to that provided by the related delay means, said means being settable for opposite polarities in the respective transceivers of a pair, so as to cancel said transmitter input modulation from the output of said FM receiver to provide a transceiver output signal.

11. A transceiver system according to claim 10 wherein said input means includes a variable gain amplifier having a signal input and a gain control input, said signal input being connected to transmitter input modulation, the output of said variable gain amplifier being connected to said frequency controlling voltage input of said oscillator; and further comprising AGC means responsive to said transceiver output signal and to said delayed transmitter input modulation for providing a gain control signal to the gain control input of said variable gain amplifier, said gain control signal adjusting the gain of said variable gain amplifier so that the magnitude of transmitter input modulation included in the output of said FM receiver is adjusted with respect to the magnitude of delayed transmitter input modulation provided by said delay unit so that the transmitter input modulation in said receiver output signal is substantially nulled to zero.

12. A transceiver system according to claim 11 wherein said AGC means comprises a synchronous demodulator having a signal input connected to the transceiver output signal of said cancel means and its reference input connected to said delay means, its output connected to said gain control input of said variable gain amplifier.

13. A transceiver system according to claim 11 wherein said cancel means includes means for selectively switching the polarity of transmitter input modulation applied to said frequency-controlling input means of said oscillator.

14. A transceiver system according to claim 11 wherein said cancel means includes means for switching the polarity of one of the input signals to said cancel means at the input thereof.

* * * * *